Patented May 27, 1941

2,243,481

UNITED STATES PATENT OFFICE 2,243,481

FURFURYL ALCOHOL RESIN

John G. Meiler, Wausau, Wis., assignor to Marathon Paper Mills Company, Rothschild, Wis., a corporation of Wisconsin No Drawing. Application May 1, 1939,
Serial No. 271,173

8 Claims. (Cl. 260—2)

This invention relates to the formation of resinous products from furfuryl alcohol and lignin-sulphonic acid compounds.

I have found that by mixing furfuryl alcohol and various lignin-sulphonic acid compounds a resinification occurs producing new and useful products. The rate of this resinification can be controlled by the amount and type of lignin-sulphonic acid compounds used, the temperature of mixture, and the absence or presence of suitable solvents.

The lignin-sulphonic acid compounds which are suitable for the purpose of this invention can be derived from waste sulphite liquor in various ways. It is preferred to use as the raw material the basic precipitate produced according to the Howard process disclosed in Reissue Patent No. 18,268, December 1, 1931. Suitable lignin-sulphonic acid compounds produced from the basic precipitate of the Howard process are disclosed in the following series of patents.

United States Patent No. 1,948,858, February 27, 1934, to Guy C. Howard, discloses a method of making an aqueous dispersion of lignin-sulphonic acid and the production of a solid product from this dispersion. These two products (1) the aqueous dispersion of lignin-sulphonic acid and (2) the solid produced therefrom are also suitable lignin-sulphonic acids for the purpose of this invention.

The precipitated lignin derivative disclosed in United States Patent No. 2,057,117, October 13, 1936, to Sandborn, Salvesen and Howard, which is a sodium salt of a partially desulphonated lignosulphonic acid and the corresponding calcium and sodium salts disclosed in United States Patent No. 2,077,884, April 20, 1937, to Howard and Sandborn are also suitable lignin-sulphonic acid compounds.

The lignin-sulphonic acid compounds derived by the process of United States Patent No. 2,077,884, April 20, 1937, as well as the similar derivatives in United States Patent No. 2,057,117, October 13, 1936, and 1,848,292, March 8, 1932, when leached with strong inorganic acids, e. g. HCl, produce partially desulphonated lignin-sulphonic acids which are also suitable. These patents disclose lignin-sulphonic acid compounds and describe various modifications of the processes disclosed therein which will also produce lignin-sulphonic acid compounds suitable for this invention in which one or more of these various modifications of lignin-sulphonic acid compounds may be used with furfuryl alcohol. It is to be understood that lignin-sulphonic acid compounds obtained from whole waste sulphite liquor processed in accordance with the aforementioned patents are also suitable for the purposes of this invention.

The following is an example of an embodiment of the invention:

| | Parts by weight |
|---|---|
| Furfuryl alcohol | 100 |
| Partially desulphonated lignin-sulphonic acids | 20 |

The ingredients in the proportions given are heated with agitation for a period of about 24 minutes in a temperature range beginning at about 40° C. and ending at about 65° C. The viscous mass is then cooled to room temperature or lower for use. It is black in color and when heated gives a hard black shiny resin. The viscous resin produced in the above example can be dissolved immediately in a suitable solvent such as methyl, ethyl, or butyl alcohol, acetone, dioxane, Cyclonol (a cyclic acetal sold by E. I. du Pont de Nemours & Company), water and the like, or it can be coated directly while in viscous condition on a sheet of paper to produce a moldable sheet.

It is to be understood that the proportions given in the above example can be varied over wide ranges. Satisfactory products have been produced using up to about 50% by weight of each of the ingredients depending upon the properties of the product desired. The aqueous lignin-sulphonic acids and the dried products from the dispersion, or the various lignin-sulphonic acid salts previously described can be substituted for the specific lignin compound given in the above example. However, in order to obtain satisfactory results, suitable changes in the heating conditions and time will have to be made depending on the amount and type of the various ligno-sulphonic acid compounds used. As previously stated, the rate of resinification can be increased by increasing the amount and type of lignin-sulphonic acid compounds used, the temperature of the mixture, and the absence or presence of suitable solvents.

I claim:

1. A resin produced by reacting furfuryl alcohol and a substance selected from the group consisting of lignin-sulphonic acids and salts thereof.

2. A resin produced by reacting furfuryl alcohol and a salt of partially desulphonated lignin-sulphonic acid.

3. A resin produced by reacting furfuryl alcohol and a partially desulphonated lignin-sulphonic acid.

4. A resin produced by reacting substantially 100 parts by weight of furfuryl alcohol and substantially 20 parts by weight of a partially desulphonated lignin-sulphonic acid.

5. A resin produced by reacting substantially 100 parts by weight of furfuryl alcohol and substantially 20 parts by weight of a substance selected from the group consisting of lignin-sulphonic acids and salts thereof.

6. A resin produced by reacting furfuryl alcohol and a substance selected from the group consisting of lignin-sulphonic acids and salts thereof in substantially equal parts by weight.

7. The process of making a resinous material which comprises heating furfuryl alcohol and a substance selected from the group consisting of lignin-sulphonic acids and salts thereof at a suitable temperature for a sufficient time to produce a viscous resinous mass and cooling said mass.

8. The process of making a resinous material which comprises heating about 100 parts by weight of furfuryl alcohol and about 20 parts by weight of a substance selected from the group consisting of lignin-sulphonic acids and salts thereof from about 40° C. to 65° C. for a sufficient period of time to produce a viscous mass, and cooling said mass.

JOHN G. MEILER.